United States Patent
Wang

[11] Patent Number: 5,678,740
[45] Date of Patent: Oct. 21, 1997

[54] COMBINATION BEVERAGE CONTAINER AND GOLF ACCESSORY HOLDER

[76] Inventor: Eric Wang, 147-20 35th Ave., Apt. 5-F, Flushing, N.Y. 11354

[21] Appl. No.: 564,558

[22] Filed: Nov. 29, 1995

[51] Int. Cl.$^6$ ................................................ B60R 11/00
[52] U.S. Cl. ........................................ 224/274; 224/919
[58] Field of Search .................................. 224/274, 918, 224/919

[56] References Cited

U.S. PATENT DOCUMENTS

| | | | |
|---|---|---|---|
| D. 176,627 | 1/1956 | Nash | 224/274 X |
| 2,782,971 | 2/1957 | Hershey | 224/274 |
| 3,528,591 | 9/1970 | Von Herbulis | 224/274 X |
| 4,032,054 | 6/1977 | Duncan | 224/274 |
| 4,736,877 | 4/1988 | Clark | 224/918 |
| 5,152,489 | 10/1992 | Christensen et al. | 224/274 X |
| 5,435,474 | 7/1995 | Lin | 224/274 |

*Primary Examiner*—Renee S. Luebke
*Attorney, Agent, or Firm*—Galgano & Burke

[57] ABSTRACT

A holder for conveniently holding an open beverage container, a scorecard, golf balls, golf tees and a pencil. The holder comprises a generally rectangular panel having a top surface and a bottom surface. Attached to a bottom surface of the panel are two generally parallel and spaced-apart downwardly depending legs for attaching therebetween to an upper member of a golf cart so that a first and a second portion of the panel extends to opposite sides of the upper member of the golf cart. A well having an open end opens onto a top surface of the second portion of the panel for receiving a beverage container therein. The well includes a bottom flange and a cylindrical sidewall. The bottom flange lies within a plane disposed at an angle to the top surface to support the bottom of a beverage container in a stable Vertical orientation when the panel is attached to a golf cart. A pair of resilient clip members attach to the first portion of the top surface of the panel to hold a scorecard. Two sets of spaced-apart downwardly depending elongated curved members attached to the bottom surface of the panel to hold a pair of golf balls. A cylindrical sleeve extending through the panel includes an axial bore for releasably holding a pencil therein. Three sets of spaced-apart upwardly extending elongated curved members attached to the top surface of the panel to hold three golf tees.

20 Claims, 3 Drawing Sheets

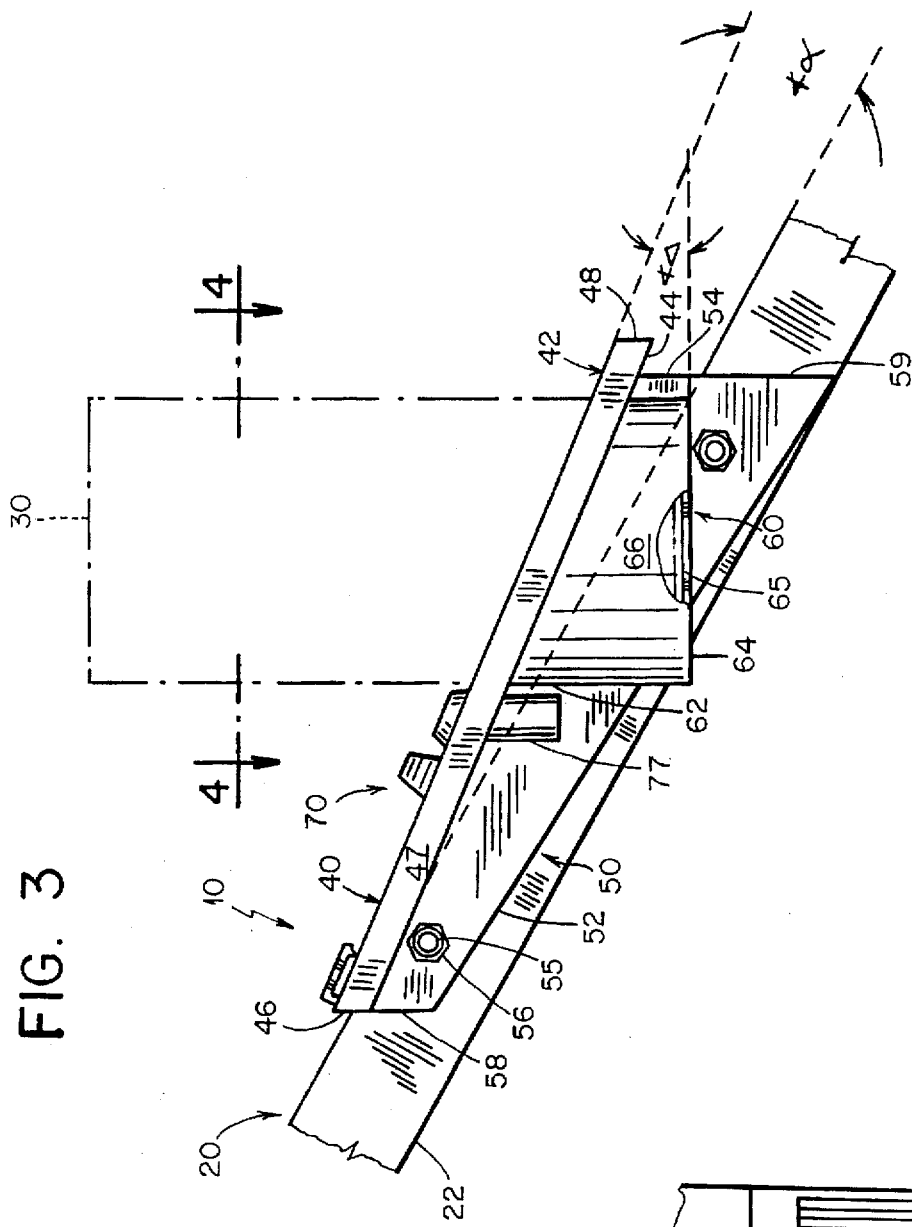
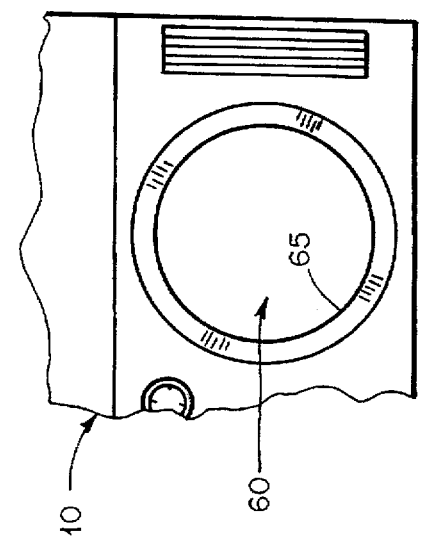

5,678,740

COMBINATION BEVERAGE CONTAINER AND GOLF ACCESSORY HOLDER

BACKGROUND OF THE INVENTION

The present invention relates generally to holders for holding a beverage container and golf accessory. More particularly, the invention relates to holders which are attached to a golf cart for holding a beverage container such as a can or a cup, and at least one golf accessory such as a scorecard, a pencil, a golf ball or a golf tee.

Several devices have been devised for golfers to make the game of golf more enjoyable. For example, golf carts make the game of golf less strenuous for a golfer by enabling a golfer to easily wheel a golf bag with clubs around a golf course.

To further make the game of golf more enjoyable, a golfer will often place one or more beverages in a pocket of a golf bag prior to starting a round of golf because of the limited opportunity to later obtain a beverage during the round. However, after opening a beverage container, a golfer has no readily available place to set the open beverage container when hitting a golf ball or while walking from one golf hole to the next. Typically, a golfer will resort to placing the beverage container on the ground when hitting a golf ball. Afterwards, the golfer will pick up and hold the beverage container in one hand while using the other to wheel the golf cart to where his or her golf ball has landed.

As far as is known, there are no presently available holders which easily attach to a golf cart and are capable of holding a beverage container, particularly an open beverage container, and golf accessories in a convenient and facile manner as herein provided.

SUMMARY OF THE INVENTION

Accordingly, it is an object of the present invention to provide a novel combination beverage container and golf accessory holder which attaches to a golf cart and provides a golfer with a convenient place for conveniently releasably retaining an open beverage container during a game of golf, particularly when hitting a golf ball and while walking from one golf hole to the next.

It is also an object of the present invention to provide a combination beverage container and golf accessory holder which attaches to a golf cart for releasably retaining an open beverage container in a stable substantially upright and level orientation, i.e., so that the contents of the beverage container do not spill out.

It is another object of the present invention to provide a combination beverage container and golf accessory holder which attaches to a golf cart for conveniently releasably retaining a scorecard, a pencil, golf balls and golf tees.

It is a further object of the present invention to provide a combination beverage container and golf accessory holder which may be manufactured relatively simply and inexpensively for widespread sale and use by golfers.

Certain of the foregoing and related objects are readily obtained in a combination beverage container and golf accessory holder for attachment to an upper member of a golf cart adjacent to a handle thereof, in which the holder comprises a generally planar panel to which are attached golf cart attaching means, a well and golf accessory holding means. The panel has an top surface, a bottom surface, a top edge and bottom edge. The golf cart attaching means attaches the panel to an upper member of a golf cart adjacent to a handle thereof. The well includes an open end opening onto the top surface for receiving and releasably retaining a beverage container in a stable generally vertical orientation when the panel is attached to the upper member of the golf cart normally disposed at a slight angle to the vertical. The golf accessory holding means holds at least one golf accessory to the planar member.

The golf cart attaching means is desirably attached to the bottom surface of the planar member and comprise two generally parallel and spaced-apart legs for receiving therebetween the upper member of the golf cart. Desirably, the legs extend the length of the panel from the top edge to the bottom edge thereof. Advantageously, a spacer disposed between the legs and adjacent the bottom edge orientates the bottom edge in spaced-apart relation to the upper member of the golf cart when the planar member is attached to the golf cart, thereby placing the panel in a relatively more horizontal position relative to the upper member.

The well preferably comprises an inwardly extending bottom flange and a cylindrically-shaped upstanding sidewall. Desirably, the bottom flange lies within a plane disposed at an angle to the top surface of the panel so that the bottom flange is disposed in a generally horizontal orientation when the holder is attached to the golf cart.

In a preferred embodiment of the present invention, the golf accessory means conveniently holds a scorecard, golf balls, golf tees and a pencil. At least one resilient clip attaches to the top surface adjacent the top edge of the panel to secure a scorecard between the resilient clip and the top surface. At least one pair of spaced-apart downwardly depending elongated curved members attach to the bottom surface of the panel for frictionally and releasably retaining a golf ball therebetween. A cylindrical sleeve extending through the top surface to the bottom surface of the panel has an axial bore sized for releasably retaining a pencil therein. At least one pair of spaced-apart upwardly extending elongated curved members attach to the top surface of the panel for frictionally and releasably retaining therebetween a golf tee.

In still another preferred embodiment of the present invention, the panel defines a first portion and an adjacent second portion in which the golf cart attaching means is attached to the bottom surface of the panel and generally disposed between the first and the second portions so that the first portion extends to one side of the upper member of the golf cart and the second portion extends to the other side of the upper member of the golf cart. Advantageously, the golf accessory holding means for holding a scorecard is attached to the first portion and the well is attached to the second portion.

Desirably, the holder is formed from a polymeric material and integrally formed as a single unit.

BRIEF DESCRIPTION OF THE DRAWINGS

FIG. 3 is an enlarged fragmentarily illustrated, side elevational view of the combination beverage container and golf accessory holder shown in FIG. 1.

FIG. 4 is a view taken along line 4—4 of FIG. 3.

DESCRIPTION OF THE PREFERRED EMBODIMENTS

Figure 1:
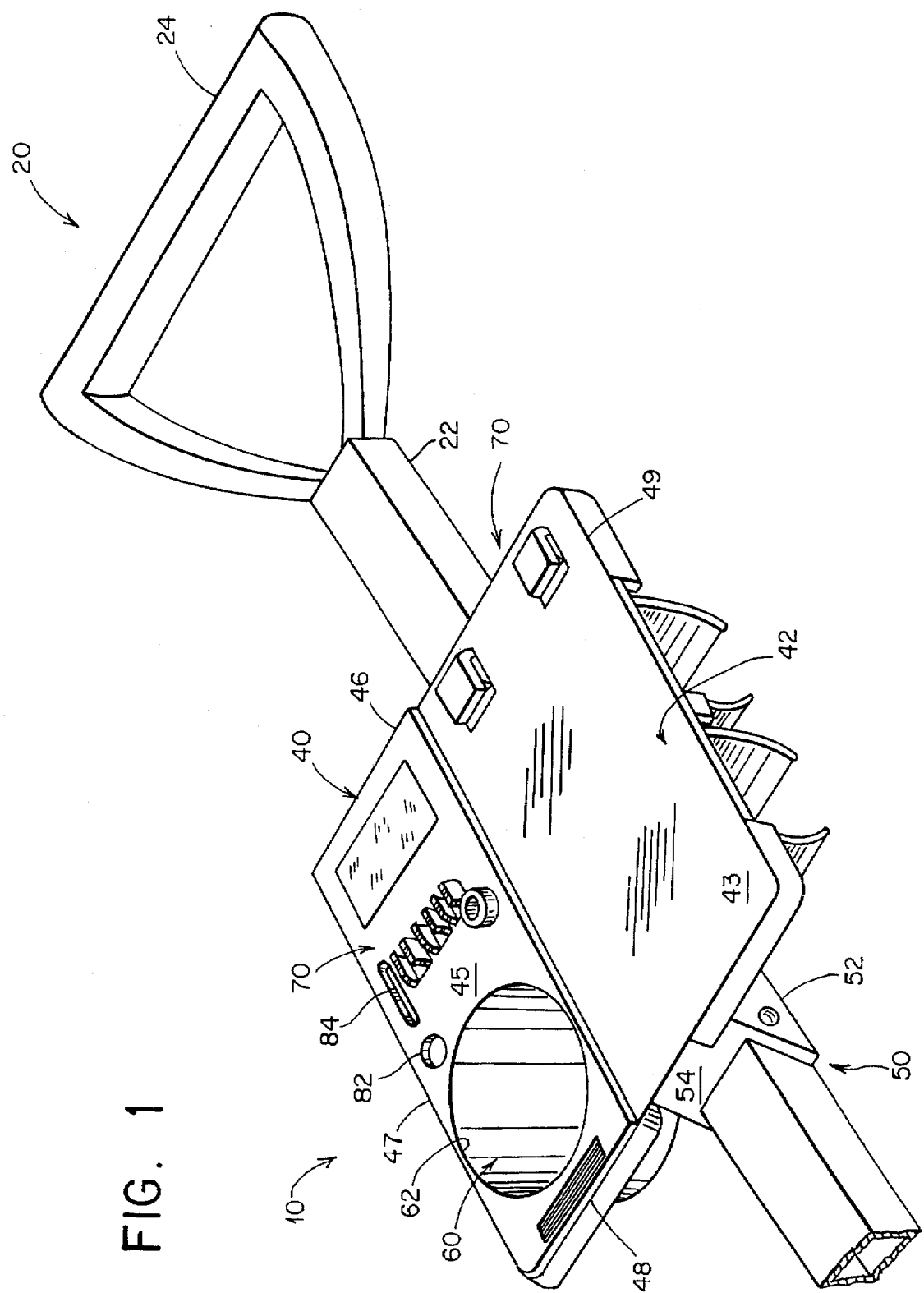
FIG. 1 is a perspective view of a combination beverage container and golf accessory holder embodying the present invention.
Figure 2:
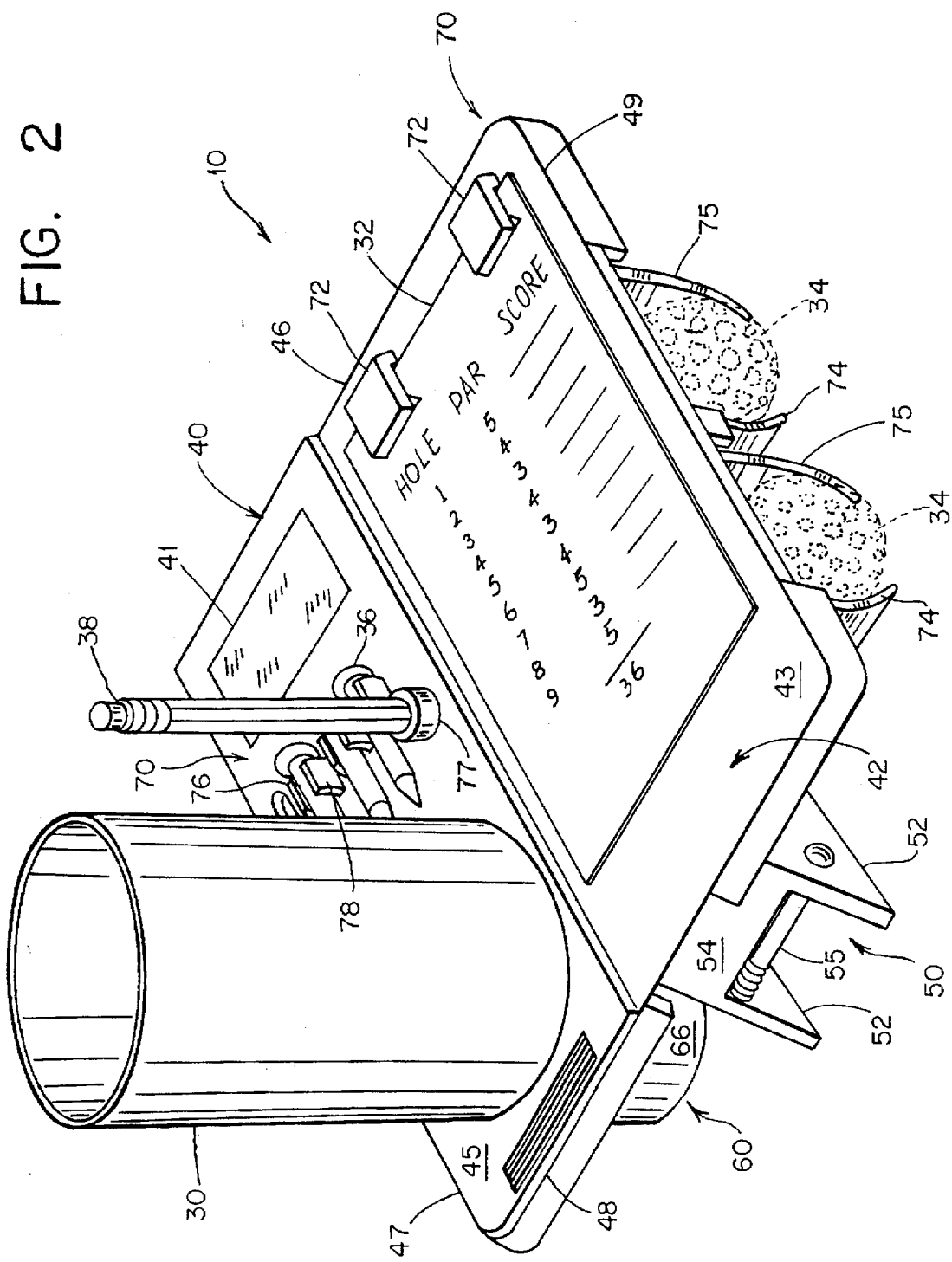
FIG. 2 is an enlarged perspective view of the combination beverage container and golf accessory holder shown in FIG. 1.

Turning now to the drawings, therein illustrated in FIGS. 1 and 2 is a novel combination beverage container and golf accessory holder 10 embodying the present invention which attaches to an upper member 22 of a golf cart 20 (FIG. 1). As shown in FIG. 2, holder 10 is compactly configured for conveniently holding a beverage container 30, a scorecard 32, golf balls 34, golf tees 36, a pencil 38, and/or other golf accessories. Holder 10 is preferably mounted adjacent a handle 24 of cart 20. It is appreciated that holder 10 is suitable for use with cart 20 which can be either manually operated or motorized, collapsible or non-collapsible.

With reference to FIGS. 1–3, holder 10 generally comprises a centrally supported rectangular planar member or panel 40 which overlies and straddles upper member 22 of cart 20. Operably attached to panel 40 are golf cart attaching means 50 for attaching panel 40 to cart 20, a well 60 for releasably retaining a beverage container 30 therein, and golf accessory holding means 70 for holding at least one golf accessory.

Specifically, panel 40 includes a top surface 42, a bottom surface 44 (FIG. 3), a top edge 46, a bottom edge 48, and two side edges 47 and 49. Desirably, panel 40 defines a first or "right" portion 43 for holding scorecard 32 and an adjacent second or "left" portion 45 for holding beverage container 30 and other golf accessories, each portion of which extending to opposite sides of upper member 22 of cart 20, the details of which will be described in greater detail hereinafter.

As shown in greater detail in FIG. 3, golf cart attaching means 50 comprises two generally parallel and spaced-apart legs 52 which downwardly depend from bottom surface 44 of panel 40 (only one leg 52 shown in FIG. 3). Legs 52 straddle and rest upon upper member 22 of cart 20 and are held thereto via nuts 56 and bolts 55 at the top end 58 and bottom end 59 thereof.

Preferably, legs 52 extend substantially all of the length between top edge 46 and bottom edge 48 of panel 40. Advantageously, legs 52 are generally wedge-shaped and a spacer 54 is disposed between lower ends 59 of legs 52 adjacent bottom edge 48 to position or elevate bottom edge 48 away from upper member 22 of cart 20 when panel 40 is attached to cart 20, i.e., to position panel 40 in a more horizontal orientation relative to upper member 22 which is disposed at a slight angle to vertical when cart 20 is at rest.

Specifically, top surface 42 is disposed at an angle α relative to upper member 22 of cart 20. Increasing angle α places panel 40 in a more horizontal orientation to make it easier to record a score on scorecard 32 (FIG. 2) when attached to holder 10, and also to aid in placing a beverage container in a generally vertical position as will be further described below.

Each leg 52 has holes (not shown) in corresponding alignment for receiving bolts 55 which extend through the holes in each leg 52 and attach to nuts 56 so as to securely attach holder 10 to upper member 22 of cart 20.

With reference again to FIGS. 1–4, well 60 comprises a generally cylindrical well depending from panel 40 for receiving and holding beverage container 30 in a stable generally vertical orientation when panel 40 is attached to upper member 22 of cart 20. As shown in FIG. 1, well 60 has an open upper end 62 opening onto top surface 42 of panel 40 and an open bottom end 64 (FIG. 3) joined by an upstanding cylindrical sidewall 66. Preferably, upper open end 62 is sized for receiving a beverage container 30 (FIG. 2) and open bottom end 64 is defined by an inwardly extending flange 65 (FIG. 4) for supporting the bottom of beverage container 30. Upper open end 62 is ovally-shaped when viewed normal to top surface 42.

As shown in FIG. 3, flange 65 lies within a plane disposed at an angle Δ to top surface 42 so that when panel 46 is attached to cart 20 flange 65 is disposed at a substantially level or horizontal orientation to support beverage container 30 in a stable vertical orientation. Although, sidewall 66 is shown as being a continuous cylindrical surface, it is appreciated that a sidewall can have openings or slits. Likewise, flange 65 is shown as being continuous, however, it is appreciated that a flange can include one or more cutouts or the like, or alternatively a solid bottom can be provided.

As shown in FIG. 2, golf accessory means 70 comprises a pair of spaced-apart resilient clip members 72 which attach to top surface 42 adjacent top edge 46 of panel 40. Clip members 72 are biased toward top surface 42 to secure an upper edge of scorecard 32 between clip 72 and top surface 42. Also, golf accessory holding means 70 comprises two sets of spaced-apart, paired, downwardly depending elongated curved members or fingers 74 and 75 attached to bottom surface 44 (FIG. 3) of panel 40 which frictionally and releasably retain golf balls 34 therebetween.

In addition, golf accessory holding means 70 includes a cylindrical sleeve 77 extending through top surface 42 to bottom surface 44 of panel 40 and has an axial bore sized for releasably retaining pencil 38 therein. Further, golf accessory holding means 70 comprises three sets of spaced-apart, paired, upwardly extending elongated curved members or fingers 76 and 78 for frictionally and releasably retaining therebetween golf tees 36 which curved members 76 and 78 are attached to top surface 42 of panel 40. It is appreciated that a golf tee 36 can be equally retained in an aperture extending through top surface 42 to bottom surface 44. A name or product plate 41 is suitably attached to panel 40 adjacent top edge 46.

With reference again to FIG. 1, panel 40 includes a circular aperture 82 and an elongate slotted aperture 84, both extending through top surface 42 to bottom surface 44 and adjacent side edge 47, for attachment to other golf accessories, e.g., a clip on towel.

Preferably, holder 10 is fabricated from a plastic or polymeric material, and desirably, is injected molded. Advantageously, panel 40, golf cart attaching means 50, beverage container holding means 60, and golf accessory holding means 70 are integrally formed in a single unit.

Various modifications may be made to the present invention, for example, it will be appreciated that one skilled in the art could employ other suitable means for releasably attaching a scorecard to panel 40, e.g., a spring biased clip. In addition, the placements of a beverage container, golf balls, golf tees, and the pencil can be disposed in other equally suitable arrangements on a panel.

What is claimed is:

1. A combination beverage container and golf accessory holder for attachment to an upper member of a golf cart adjacent to a handle thereof, the holder comprising:

a generally planar panel having a top surface, a bottom surface, a top edge and a bottom edge;

golf cart attaching means attached to said panel for attaching said panel to an upper member of a golf cart adjacent to a handle thereof;

a well fixedly attached to said panel having an open end opening onto said top surface for receiving and releasably retaining a beverage container in a stable generally vertical orientation when said panel is attached to the upper member of the golf cart in a non-horizontal orientation; and golf accessory holding means attached to said panel for releasably securing at least one golf accessory to said panel.

2. A holder according to claim 1, wherein said golf accessory means comprises at least one resilient clip member attached to said top surface to secure a scorecard between said resilient clip and said top surface.

3. A holder according to claim 1, wherein said golf accessory means comprises at least one pair of spaced-apart downwardly depending elongated curved members, attached to said bottom surface of said panel, for frictionally and releasably retaining therebetween a golf ball.

4. A holder according to claim 1, wherein said golf accessory means comprises a cylindrical sleeve extending through said top surface to said bottom surface of said panel and having an axial bore sized for releasably retaining a pencil therein.

5. A holder according to claim 1, wherein said golf accessory means comprises at least one pair of spaced-apart upwardly extending elongated curved members, attached to said top surface of said panel, for frictionally and releasably retaining therebetween a golf tee.

6. A holder according to claim 1, wherein said golf accessory means comprises at least one resilient clip attached to said top surface to secure a scorecard between said clip and said top surface, at least one pair of downwardly depending elongated curved members, attached to said bottom surface of said panel, for frictionally and releasably retaining a golf ball therebetween, a cylindrical sleeve extending through said top surface to said bottom surface of said panel and having an axial bore sized for releasably retaining a pencil therein, and at least one pair of spaced-apart upwardly extending elongated curved members, attached to said top surface of said panel, for frictionally and releasably retaining therebetween a golf tee.

7. A holder according to claim 1, wherein said panel defines a first portion and an adjacent second portion and wherein said golf cart attaching means is attached to said bottom surface of said panel and generally disposed between said first and said second portions so that said first portion extends to one side of the upper member of the golf cart and said second portion extends to the other side of the upper member of the golf cart.

8. A holder according to claim 7, wherein said golf accessory holding means for holding a scorecard is attached to said first portion and said well is attached to said second portion.

9. A holder according to claim 1, wherein said holder is formed from a polymeric material.

10. A holder according to claim 9, wherein said holder is integrally formed as a single unit.

11. A combination beverage container and golf accessory holder for attachment to an upper member of a golf cart adjacent to a handle thereof, the holder comprising;

a generally planar panel having a top surface, a bottom surface, a top edge and a bottom edge;

golf cart attaching means attached to said panel for attaching said panel to an upper member of a golf cart adjacent to a handle thereof;

a well attached to said panel having an open end opening onto said top surface for receiving and releasably retaining a beverage container in a stable generally vertical orientation when said panel is attached to the upper member of the golf cart, said well having a bottom disposed at an angle to said top surface of said panel so that said bottom is disposed in a generally horizontal orientation when said holder is attached to the golf cart; and golf accessory holding means attached to said panel for releasably securing at least one golf accessory to said panel.

12. A holder according to claim 11, wherein said golf cart attaching means attaches to said bottom surface of said panel.

13. A holder according to claim 12, wherein said golf cart attaching means comprises two generally parallel and spaced-apart legs for receiving therebetween the upper member of the golf cart.

14. A holder according to claim 13, wherein said legs extend the length of said panel from said top edge to said bottom edge thereof.

15. A holder according to claim 13, wherein said golf cart attaching means comprises a spacer disposed between said legs and adjacent said bottom edge to orientate said bottom edge in spaced-apart relation to the upper member of the golf cart when said panel is attached to the golf cart thereby placing said panel in a relatively more horizontal position relative to said upper member.

16. A holder according to claim 13, wherein each of said legs have at least one hole for receiving a bolt.

17. A combination beverage container and golf accessory holder for attachment to an upper member of a golf cart adjacent to a handle thereof, the holder comprising;

a generally planar panel having a top surface, a bottom surface, a top edge and a bottom edge;

golf cart attaching means attached to said panel for attaching said panel to an upper member of a golf cart adjacent to a handle thereof, said attaching means comprising two spaced-apart legs which depend from said bottom surface and extend substantially the length of said panel from said top edge to said bottom edge;

a well attached to said panel having an open end opening onto said top surface for receiving and releasably retaining a beverage container in a stable generally vertical orientation when said panel is attached to the upper member of the golf cart; and golf accessory holding means attached to said panel for releasably securing at least one golf accessory to said panel.

18. A holder according to claim 17, wherein said well comprises an inwardly extending bottom flange and an upstanding sidewall.

19. A holder according to claim 18, wherein said upstanding sidewall is cylindrically-shaped.

20. A holder according to claim 18, wherein said bottom flange lies within a plane disposed at an angle to said top surface of said panel so that said bottom flange is disposed in a generally horizontal orientation when said holder is attached to the golf cart.

* * * * *